United States Patent
Chemali et al.

(10) Patent No.: US 6,377,050 B1
(45) Date of Patent: Apr. 23, 2002

(54) LWD RESISTIVITY DEVICE WITH INNER TRANSMITTERS AND OUTER RECEIVERS, AND AZIMUTHAL SENSITIVITY

(75) Inventors: Roland Chemali, Ft. Worth, TX (US); Russell Lloyd Dummer, Idaho Falls, ID (US)

(73) Assignee: Computalog USA, Inc., Fort Worth, TX (US)

(*) Notice: Subject to any disclaimer, the term of this patent is extended or adjusted under 35 U.S.C. 154(b) by 0 days.

(21) Appl. No.: 09/398,953

(22) Filed: Sep. 14, 1999

(51) Int. Cl.⁷ .................................................. G01V 3/30
(52) U.S. Cl. ........................................ 324/338; 324/339
(58) Field of Search ................................ 324/338, 333, 324/335, 339, 343, 340, 341, 342, 355, 356; 702/7

(56) References Cited

U.S. PATENT DOCUMENTS

| | | | |
|---|---|---|---|
| 4,899,112 A | 2/1990 | Clark et al. | 324/338 |
| 4,949,045 A | 8/1990 | Clark et al. | 324/338 |
| 4,968,940 A | 11/1990 | Clark et al. | 324/338 |
| 4,972,150 A | 11/1990 | Tabbagh | |
| 5,345,179 A | 9/1994 | Habashy et al. | |
| 5,594,343 A | 1/1997 | Clark et al. | 324/338 |
| 5,869,968 A | 2/1999 | Brooks et al. | |
| 5,892,460 A | 4/1999 | Jerabek et al. | 340/856.4 |

FOREIGN PATENT DOCUMENTS

| | | |
|---|---|---|
| GB | 2287324 A | 9/1995 |
| WO | WO95/31736 | 11/1995 |

OTHER PUBLICATIONS

Barabara Anderson et al., "Response of 2–MHz LWD REsistivity and Wireline Induction Tools in Dipping Beds and Laminated Formations," SPWLA 31st Annual Logging Symposium, Jun. 24–27, 1990, pp. 1–25.

W. Hal Meyer et al., "A New Slimhole Multiple Propagation Resistivity Tool," SPWLA 35th Annual Logging Symposium, Jun. 19–22, 1994, pp. 1–21.

International Search Report, International Application No. PCT/US00/40769, international filing date:Aug. 29, 2000, Applicant: Computalog, U.S.A., Inc. 10 pages.

Primary Examiner—Walter Snow
(74) Attorney, Agent, or Firm—Geoffrey A. Mantooth

(57) ABSTRACT

A borehole tool for logging resistivity of geologic formations, having at least two inner transmitters surrounded by at least two outer receivers. Each transmitter is sequentially excited, and measurements are taken at each of the receivers. The phase differences between these received signals are determined, once for each transmitter, and the two values are averaged to estimate the resistivity value of the surrounding formations. More than two receivers can be used. An azimuthal receiver array is also used to identify boundary transitions.

27 Claims, 2 Drawing Sheets

LWD RESISTIVITY DEVICE WITH INNER TRANSMITTERS AND OUTER RECEIVERS, AND AZIMUTHAL SENSITIVITY

BACKGROUND OF THE INVENTION

1. Field of the Invention

The present invention generally relates to oil and gas well (borehole) logging tools, specifically to an improved method of measuring resistivity of geologic formations, and more particularly to a method of logging-while-drilling using a dual-transmitter, dual-receiver, or multi-pair receiver, resistivity measuring collar.

2. Description of Related Art

Logging tools for measuring earth formation properties are well known, particularly those used in the location of underground petroleum products (oil and gas). Borehole logging instruments use various techniques to determine geophysical properties such as bulk density, resistivity, porosity, etc. From these properties, the lithology of the surrounding formation can be predicted, i.e., whether the predominant minerals are sandstone, limestone, dolomite, etc., which provides an indication of the likelihood of the presence of petroleum products or hydrocarbons in the formation.

Techniques for ascertaining formation properties include those involving the use of radiant (electromagnetic) energy. For example, gamma rays are commonly used to measure bulk density of a formation by detecting such radiation as it passes through the formation, and relating the amount of detected radiation to the electron density of the formation. Lower energy techniques, such as those using frequencies around 2 MHz, can be used for resistivity logging via electromagnetic induction or electromagnetic wave propagation. Porous formations having high resistivity generally indicate the presence of hydrocarbons, while those having low resistivity are often water saturated.

Logging while drilling (LWD) is often run in lieu of wireline logging tools. This approach is more cost effective than the somewhat repetitive steps of drilling a well, and afterwards logging the well with an induction wireline tool. More importantly, logging while drilling allows the drilling team to better direct the drill string, that is, dynamically adjust the depth, attitude, inclination, etc., based on concurrent data analysis. LWD resistivity tools operating at relatively higher frequencies (e.g., 2 MHz) are easier to implement than low frequencies, but at higher frequencies the skin effect is more pronounced than at lower frequencies, making the measurement more sensitive to the resistivity of the formation only a few inches away from the borehole. Wireline induction tools which operate generally or traditionally at lower frequency (e.g., 20 KHz) have a greater range and better accuracy.

It has been known for a long time that for an electromagnetic wave propagating in a conductive medium, such as a geological formation, the higher the conductivity, the higher the phase shift measured at two receivers placed away from the transmitter, (see U.S. Pat. Nos. 3,551,797 and 3,849,721). Similarly the higher the conductivity, ie., the lower the resistivity, the larger the attenuation measured between two such receivers. The main reason people measure both phase and attenuation is because it has been shown, and generally accepted in the industry that the attenuation measurement sees deeper in the formation, away from the borehole, than the phase measurement. See U.S. Pat. No. 4,185,238. The combination of both phase and attenuation provides a visual indication of the existence of invasion, since both measurements will coincide in non-invaded formations and will separate in invaded formations. The dielectric constant also affects the phase and attenuation and plays a parasitic role in the whole process.

One commonly used design provides two outer transmitters and two inner receivers, as shown in FIG. 1, and described in U.S. Pat. No. 4,899,112. The upper and lower transmitters $T_U$ and $T_L$ are sequentially energized, and the phase difference and attenuation between the receivers $R_U$ and $R_L$ are recorded for each transmitter. The phase differences and attenuations are averaged with the proper polarity, and these average values used to determine resistivity.

One problem with this approach is that the distance between transmitters should be relatively large, meaning that power must be transported a relatively large distance to the transmitters (if a single power source is to be used), and the attendant ohmic losses increase power consumption. Downhole power is at a premium in LWD, and many LWD subassemblies are energized by expensive lithium batteries (it would be more problematic to provide separate power sources for the transmitters).

Other commercially available resistivity tools use a dual or multiple spacing coil array similar to that shown in the '112 patent. The reason for multiple transmitter pairs is to investigate at a plurality of radial distances away from the borehole axis. Typically the further the transmitter from the receiver, the deeper the reading, until such time where the skin effect limits the depth of investigation. Also for a given transmitter receiver spacing, it has been shown that the depth of investigation is generally larger for attenuation derived resistivity measurement than for phase derived resistivity measurement. As seen in FIG. 2, four outer transmitters are used with two inner receivers. With this construction, all four transmitters (upper and lower shallow transmitters $T_{US}$ and $T_{LS}$, and upper and lower deep transmitters $T_{UD}$ and $T_{LD}$) are again sequentially energized. For each of the four states in the energization cycle, the phase differences and attenuations between the upper and lower receivers are recorded, and these phase differences and attenuations are again averaged with the proper polarity.

A multiple spacing coil array system such as that shown in FIG. 2 not only suffers from the same problems as the configuration of FIG. 1, but further takes longer to perform a full cycle, and requires more electrical energy to power the four different states. For multiple spacings beyond two, the time and energy penalties increase even more.

In light of the foregoing, it would be desirable to provide an improved method and downhole tool for resistivity measurements. It would be further advantageous if the method and tool were easily adapted for logging while drilling.

SUMMARY OF THE INVENTION

It is therefore one object of the present invention to provide an improved method and device for resistivity logging of geologic formations.

It is another object of the present invention to provide such a method and device that have reduced power requirements, while still maintaining accurate resistivity measurements.

It is yet another object of the present invention to provide such a method and tool that can advantageously be applied to logging while drilling (LWD).

The foregoing objects are achieved in an LWD resistivity device generally comprising at least two inner transmitters surrounded by at least two outer receivers, wherein each transmitter is sequentially excited, and measurements taken at each of the two receivers. The voltages at the two receivers will be sinusoidal signals with the same frequency as the given transmitter and the phase difference between these two signals is determined, once for each transmitter. The two values will then be averaged. The average phase difference between the two receivers is used to estimate the resistivity value of the surrounding formations. This construction requires less power to operate than prior art systems. Similarly, the attenuation of the signal between these two receivers is determined once for each transmitter. The two values corresponding to the two transmitters respectively are then averaged. The average attenuation between the two receivers is used to estimate the resistivity value of the surrounding or adjacent earth formation. Mathematical modeling shows that the depth of investigation of the attenuation derived resistivity measurement is generally greater than the depth of investigation of the phase derived resistivity measurement.

In a multiple coil spacing embodiment, four outer receivers are used with at least two inner transmitters, there being two receivers on each end of the collar. Measurements for multiple receivers can be carried out simultaneously, allowing faster logging, and providing further energy savings. Symmetrical or nearly symmetrical receivers' data are averaged for the two transmitters. Mathematical modeling shows that the longer the spacing between the transmitter and the receiver, the deeper is the investigation of the device, both for the phase and the attenuation derived resistivities. Therefore, multiple pairs of outer receivers yield multiple depths of investigation for the phase derived resistivity and multiple depths of investigation for the attenuation derived resistivity.

In a further embodiment, an azimuthal receiver array is used to identify nearby or approaching boundary transitions.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 3:
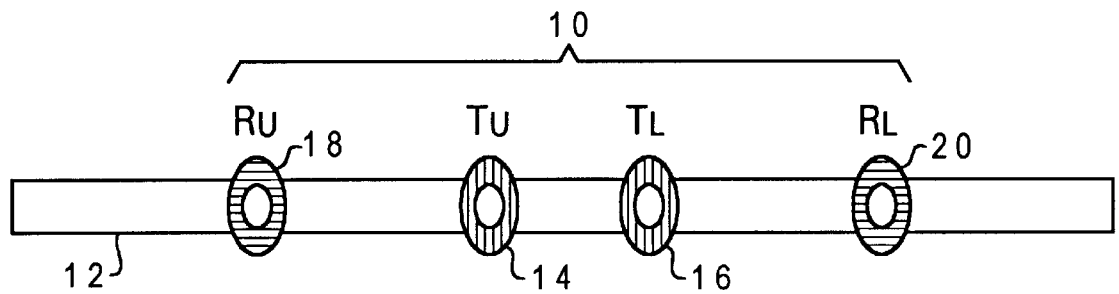
FIG. 3 is a schematic representation of one embodiment of a downhole wave propagation tool for measuring resistivity constructed in accordance with the present invention, having two outer receivers and two inner transmitters.

With reference now to the figures, and in particular with reference to FIG. 3, there is depicted a schematic representation of one embodiment 10 of a borehole wave propagation tool constructed in accordance with the present invention and adapted to measure the resistivity of a geologic formation. In this embodiment, tool 10 is comprised of a housing or collar 12, and two inner transmitters 14 and 16 surrounded by two outer receivers 18 and 20. One end of tool 10 may be considered an upper end, and the other a lower end, so transmitter 14 may be referred to as an upper transmitter while transmitter 16 may be referred to as a lower transmitter, and receiver 18 may be referred to as an upper receiver while receiver 20 may be referred to as a lower receiver. However, since the tool may be used at various inclinations (including horizontal), the terms "upper" and "lower" should not be construed in a limiting sense.

Tool 10 is incorporated on a drill collar or drill pipe, and connected to data transmission means to the surface. Typical data transmission means include mud pulse telemetry and electromagnetic telemetry. In many instances, the data is also stored in memory downhole and retrieved at a later time. The present invention may be also implemented on a conventional wireline tool. Tool 10 is adapted to be connected to a surface computer (not shown) and lowered into a well bore by a wireline and appropriate mechanical support. The surface computer is used for data acquisition, analysis and storage, and can merge various data with other raw measurements for storage and concurrent or later presentation.

Collar 12 is generally tubular, having a circular cross-section. Each of the transmitters 14 and 16 is an induction coil (wire winding). Receivers 18 and 20 are similar coils. While the signals (wave trains) transmitted from transmitters 14 and 16 and the signals received by receivers 18 and 20 may be of varying frequencies, in the illustrative embodiment the transmitters and receivers are adapted to emit and sense, respectively, signals having a central frequency typically between 400 KHz and 4 MHz.

Two sets of measurements are sequentially taken using the transmitters and receivers. First, one of the transmitters (e.g., upper transmitter 14) is energized, and the phase difference and relative attenuation values between signals received at both receivers are again recorded. A mean (or average) phase difference and a mean (or average) relative attenuation are derived by averaging the respective data for the two transmitted waves. Each of these average data is then converted into a value representing the resistivity of the surrounding formation. The converted data is displayed at the surface computer. This information can be used for the identification of the distance to bed layer transitions that exist to the sides of the drilling tool, and thereby help the drilling team to know where to direct the drill string.

A particular advantage of the foregoing construction is that the transmitters are located near one another, and the center of the coil array, so there is no need to transport the power over tens of inches, thus minimizing ohmic losses in the wiring. Consequently, this construction requires less power than prior art dual spacing systems, such as that shown in FIG. 1.

Figure 4:
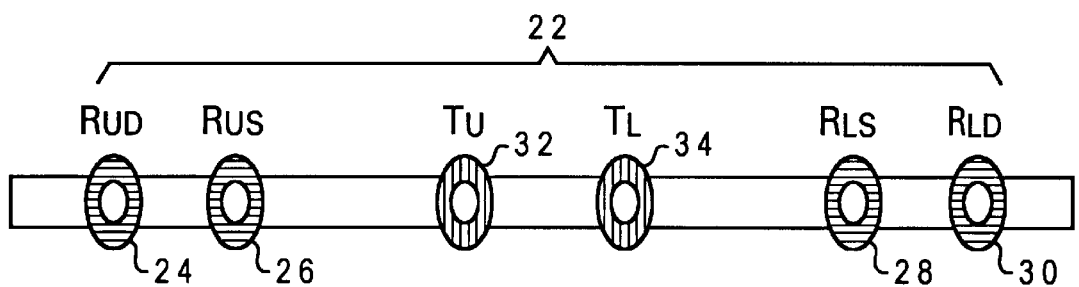
FIG. 4 is a schematic representation of another embodiment of a downhole wave propagation tool for measuring resistivity constructed in accordance with the present invention, having four outer receivers and two inner transmitters.

A multiple coil spacing array embodiment 22 of the present invention is shown in FIG. 4. In this embodiment, four outer receivers 24, 26, 28 and 30 are deployed about the two inner transmitters 32 and 34. Two sets of measurements are again sequentially taken. First, one of the transmitters (e.g. upper transmitter 32) is energized, and the phase difference and the relative attenuation value between signals received at the outer pair of receivers, or deep receivers, are recorded. Similarly the phase difference and the relative attenuation value between signals received at the inner receivers, of shallow receivers, are recorded. Then, the other transmitter (e.g. lower transmitter 34) is energized, and the phase difference and the relative attenuation value between signals received at the outer pair of receivers, or deep receivers, are recorded. Similarly, the phase difference and the relative attenuation value between signals received at the inner receivers, or shallow receivers, are recorded. The average of the phase difference between deep receivers 24 and 30, measured when each of transmitters 32 and 34 is energized, is then converted to a value representing a first resistivity measurement. This first resistivity measurement would be designated Phase Deep. The average of the wave attenuation between deep receivers 24 and 30, measured when each of transmitters 32 and 34 is energized, is then converted to a value representing a second resistivity measurement. This second resistivity measurement would be typically designated Attenuation Deep. The average of the phase difference between the shallow receivers 26 and 28, measured when each of transmitters 32 and 34 is energized, is then converted into a value representing a third resistivity measurement. This third resistivity measurement would be typically designated Phase Shallow. Finally, the average of the wave attenuation between shallow receivers 26 and 28, measured when each of transmitters 32 and 34 is energized, is then converted into a value representing a fourth resistivity measurement. This fourth resistivity measurement would be typically designated Attenuation Shallow. The conversion from average phase difference to resistivity is carried out through an algorithm based on theoretical modeling. The conversion from average attenuation to resistivity is also carried out through an algorithm based on theoretical modeling.

Figure 1:
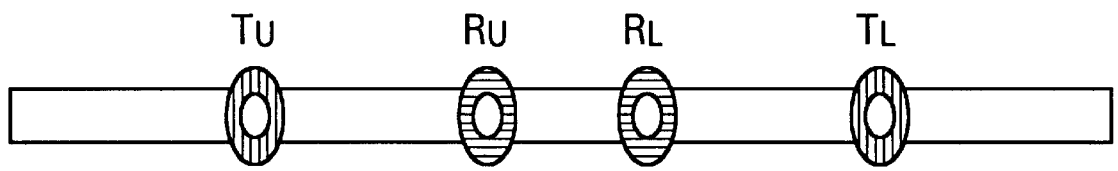
FIG. 1 is a schematic representation of a conventional downhole wave propagation tool for measuring resistivity of a geologic formation, having two outer transmitters and two inner receivers.
Figure 2:
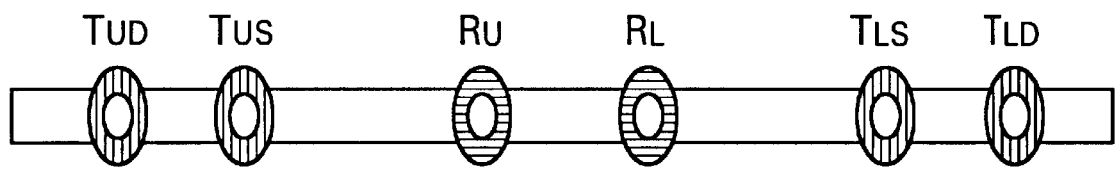
FIG. 2 is a schematic representation of another conventional downhole wave propagation tool for measuring resistivity, having four outer transmitters and two inner receivers.

Since all four receivers can be used during each signal transmission, the entire measurement sequence can be accomplished in the same time frame as the measurements derived from the embodiment of FIG. 1, and twice as fast as the method carried out with the prior art multiple spacing coil array shown in FIG. 2. This corresponds to a power savings of about 50%. Clearly an implementation according to the present invention with more than 2 pairs of receiver will have an even larger power savings compared to an implementation according to the prior art.

Computer codes available routinely from various organizations and universities, predict phase difference and attenuation for a given coil array, in a given formation. The simplest codes compute the response when the medium surrounding the instrument is homogeneous in resistivity. So-called 1-d and 2-d programs predict the tool response when the earth formation modeled is more complex and includes a well-bore of different resistivity, a cylindrical invasion co-axial with the well-bore, and/or layering normal to the well-bore axis. In the present invention (like in nearly all inventions describing wave propagation devices), the simple homogeneous medium model is applied to computing a predictive algorithm. These algorithms are in turn used during or after the logging operation to derive a resistivity measurement from the recorded phase difference and attenuation as noted above. As computing power continues to increase, more sophisticated programs can be developed which derive more exactly the resistivity from measured phase difference and attenuation. Such programs take into account the exact tool geometry and the formation boundaries.

Figure 5:
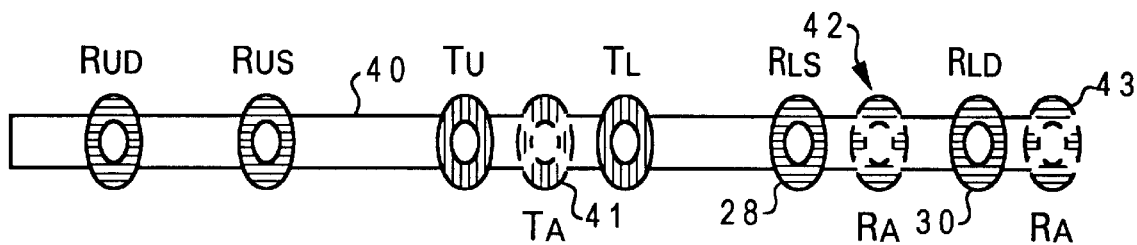
FIG. 5 is perspective view of another embodiment of a downhole wave propagation tool for measuring resistivity, constructed in accordance with the present invention, having one or more arrays of azimuthal transmitters and/or one or more arrays of azimuthal receivers, used for boundary detection and identification.
Figure 6:
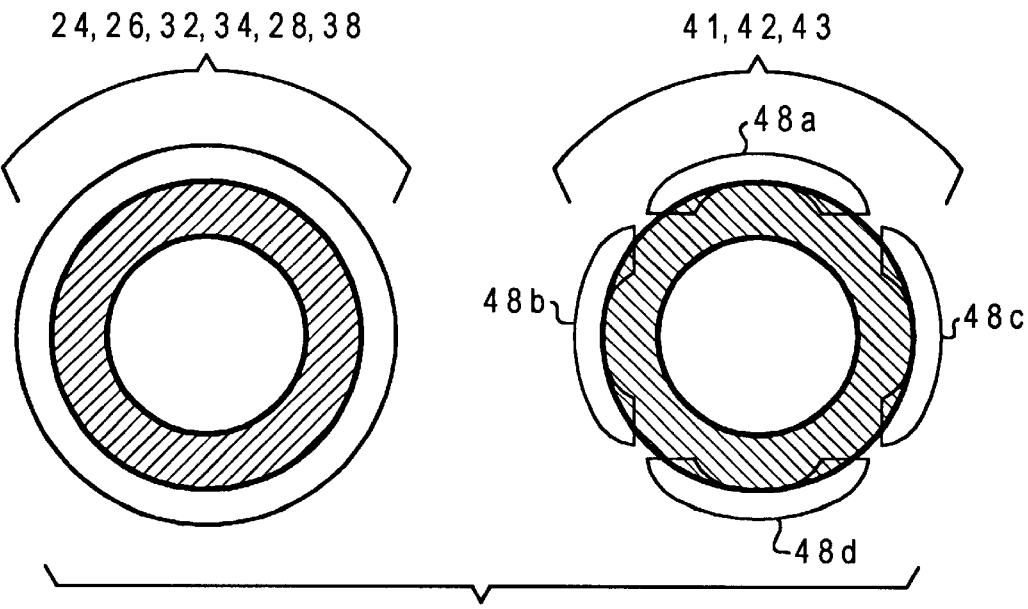
FIG. 6 is a cross-sectional view of the azimuthal receiver array of FIG. 5.

With further reference to FIG. 5, there is depicted another embodiment 40 of a downhole wave propagation tool, constructed in accordance with the present invention, having one or more arrays of azimuthal receivers, and one or more arrays of azimuthal transmitters. Such azimuthal arrays are used for detecting the presence of an approaching bed boundary, as well as its direction with respect to the well-bore. Tool 40 has one or more azimuthal transmitters 41, and one or more azimuthal receivers 42, 43. The azimuthal transmitter or receiver array 41, 42, 43 is shown in FIG. 6. For comparison purpose a standard transmitter or receiver coil (14–20, 24–30) is also shown in FIG. 6. In this embodiment, four azimuthal transmitters or receivers 48a, 48b, 48c, 48d symmetrically (regularly) spaced about the axis of the sonde, are used to determine the existence and direction of a bed layer transition positioned near the tool. The azimuthal transmitter array is centrally located, and two azimuthal receiver arrays are positioned closer to the drill bit. The set of one transmitter array 41, and two receiver arrays 42 and 43 may be viewed as a set of four, mutually independent, single-transmitter 2-receiver wave propagation tools, corresponding respectively to the four segments 48a, 48b, 48c and 48d of the individual coils. As usual a phase derived resistivity, and an attenuation derived resistivity may be measured from each of the four wave propagation tools thus formed. A single-transmitter, dual-receiver wave propagation tool exhibits an apparent resistivity maximum in form of a predictable sharp peak, also known as polarization horn, when crossing a boundary. This is especially true for the phase-derived resistivity. When the tool is far away from bed boundaries, all four phase resistivities are substantially equal. As the tool approaches a bed boundary, the resistivity measured by the quadrant closest to the boundary rises first (say 48a). The resistivity measured by the quadrant farthest from the boundary rises last (say 48d). If the tool straddles the boundary and then crosses it, resistivity from side 48a will drop first, resistivity from side 48d will drop last. The converse is true if the tool does not cross the boundary, but simply moves back away from it. The above analysis is possible only if the tool has at least 3 sectors. Increasing the number of sectors to 4, 5, 6, etc., helps refine the relative angle of approach.

A substantial simplification of the hardware with essentially similar results may be achieved by replacing $T_A$ with either $T_U$ or $T_L$. The azimuthal measurement is then performed during the same cycle as the standard measurement, thus saving considerable amount of power, and reducing complexity. An additional reduction in complexity may be achieved by using $R_A$ 42 and $R_A$ 43 in lieu of $R_{LS}$ 28 and $R_{LD}$ 30 and applying the average phase difference and attenuation around all the quadrants or sectors to represent the phase difference and attenuation for the non-azimuthally sensitive standard measurement.

A geographic reference for the collar may be established using, e.g., a magnetic compass or gyroscope.

What is claimed is:

1. A method of measuring the resistivity of a material, comprising the steps of:

providing a drill collar with at least two transmitters and at least two receivers proximate the material, the transmitters and the receivers being aligned and the receivers surrounding the transmitters;

transmitting a first electromagnetic wave train into the material using a first one of the transmitters;

recording first electromagnetic signals sensed by the receivers in response to the first wave train, and recording a first phase difference between a pair of outermost receivers for the first wave train;

transmitting a second electromagnetic wave train into the material using a second one of the transmitters;

recording second electromagnetic signals sensed by the receivers in response to the second wave train, and recording a second phase difference between said pair of outermost receivers for the second wave train; and estimating the resistivity of the material using the first and second electromagnetic signals.

2. The method of claim 1 wherein:

the material is a geologic formation;

the transmitters and receivers are housed in a borehole tool; and said placing step includes the step of lowering the tool through a borehole in the formation.

3. The method of claim 1 wherein:

said placing step places four outer receivers surrounding and aligned with the transmitters; and said recording steps record the electromagnetic signals sensed at all four receivers.

4. The method of claim 1 wherein there are an even number of receivers and said placing step places the same number of receivers on either side of the transmitters.

5. The method of claim 1 wherein said placing step places the receivers symmetrically about a midpoint between the transmitters.

6. The method of claim 1 wherein said estimating step averages the phase difference for the first wave train with the phase difference for the second wave train.

7. The method of claim 6 wherein a theoretical model estimates the resistivity based on an average of the phase differences.

8. The method of claim 6 wherein said recording steps further records attenuation differences between the receivers.

9. The method of claim 8 wherein said estimating step averages the attenuation difference for the first electromagnetic signals with the attenuation difference for the second electromagnetic signals.

10. The method of claim 9 wherein said estimating step converts the attenuation differences to the resistivity based on a theoretical model.

11. A logging while drilling device for measuring resistivity of a material, comprising:

a housing incorporated on a drill collar;

at least two transmitters supported by said housing;

at least two receivers supported by said housing, said transmitters and said receivers being aligned, and said receivers surrounding said transmitters; and means for estimating the resistivity of the material using (i) first electromagnetic signals sensed by said receivers in response to a first electromagnetic wave train transmitted into the material using a first one of said transmitters, and (ii) second electromagnetic signals sensed by said receivers in response to a second electromagnetic wave train transmitted into the material using a second one of said transmitters; and said estimating means records a first phase difference between a pair of outermost receivers for the first wave train, and records a second phase difference between said pair of outermost receivers for the second wave train.

12. The device of claim 11 wherein the material is a geologic formation, and said housing is a borehole tool adapted to be lowered into a borehole of the formation.

13. The device of claim 11 wherein four outer receivers surround and are aligned with said transmitters, and said estimating means uses electromagnetic signals from all of said receivers to estimate the resistivity.

14. The device of claim 11 wherein an even number of said receivers are supported by said housing, distributed evenly on either side of said transmitters.

15. The device of claim 11 wherein said receivers are placed symmetrically about a midpoint between said transmitters.

16. The device of claim 11 wherein said estimating means averages the phase difference for the first electromagnetic signals with the phase difference for the second electromagnetic signals.

17. The device of claim 16 wherein:

said housing is elongate; and said estimating means uses a theoretical model to estimate the resistivity based on an average of the phase differences.

18. The device of claim 16 wherein said estimating means uses attenuation differences recorded between the receivers.

19. The device of claim 18 wherein said estimating means averages the attenuation differences for the first electromagnetic signals with the attenuation difference for the second electromagnetic signals.

20. The device of claim 19 wherein said estimating means converts the attenuation differences to the resistivity based on a theoretical model.

21. A device for logging a geologic formation, comprising:

a collar;

at least one transmitter array supported by said collar;

means for sensing a boundary transition in said formation, proximate said collar, based on the resistivity of the formation about the transition, said sensing means includes at least one azimuthal receiver array having at least three azimuthal receiver coils located about an axis of said collar;

said azimuthal receiver array is a first azimuthal receiver array;

said sensing means firther includes a second azimuthal receiver array having at least three azimuthal receiver coils aligned, respectively, with said azimuthal receivers of said first azimuthal receiver array;

said transmitter array has at least three azimuthal transmitters aligned, respectively, with said azimuthal receivers of said first and second azimuthal receiver arrays; and said sensing means senses the boundary transition by measuring phase differences for pairs of respectively aligned azimuthal receivers in response to wave trains transmitted from a respectively aligned azimuthal transmitter.

22. The device of claim 21 wherein said sensing means determines the direction of the transition with respect to said collar.

23. The device of claim 22 wherein said sensing means further determines whether said collar is straddling the transition.

24. The device of claim 21 wherein said transmitter array has at least three azimuthal transmitters located about the axis of said collar.

25. The device of claim 21 wherein said sensing means further tracks angular displacement of said collar.

26. The device of claim 21 wherein said azimuthal receivers are located symmetrically about the axis of said collar.

27. The device of claim 21 further comprising means for establishing a geographic reference for the collar.

* * * * *